United States Patent
Nabetani et al.

(10) Patent No.: US 8,139,506 B2
(45) Date of Patent: Mar. 20, 2012

(54) WIRELESS COMMUNICATION APPARATUS FOR DATA COMMUNICATION THROUGH TWO OR MORE CHANNELS

(75) Inventors: Toshihisa Nabetani, Kawasaki (JP); Kiyoshi Toshimitsu, Tokyo (JP); Ryoko Matsuo, Tokyo (JP); Tatsuma Hirano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/438,848

(22) PCT Filed: Dec. 18, 2008

(86) PCT No.: PCT/JP2008/073666
§ 371 (c)(1),
(2), (4) Date: Feb. 25, 2009

(87) PCT Pub. No.: WO2009/084609
PCT Pub. Date: Jul. 9, 2009

(65) Prior Publication Data
US 2011/0038262 A1 Feb. 17, 2011

(30) Foreign Application Priority Data
Dec. 27, 2007 (JP) ................ 2007-336506

(51) Int. Cl.
*H04L 12/28* (2006.01)
(52) U.S. Cl. ........ 370/254; 370/232; 370/278; 370/329; 370/338
(58) Field of Classification Search .......... 370/232, 370/254, 278, 310, 328, 329, 338
See application file for complete search history.

(56) References Cited

U.S. PATENT DOCUMENTS

| | | | |
|---|---|---|---|
| 2004/0223478 A1 | 11/2004 | Fischer et al. | |
| 2005/0250507 A1* | 11/2005 | Leung et al. | 455/452.1 |
| 2006/0083183 A1* | 4/2006 | Teague et al. | 370/278 |
| 2007/0105574 A1* | 5/2007 | Gupta et al. | 455/509 |
| 2007/0165587 A1* | 7/2007 | Choi | 370/338 |

FOREIGN PATENT DOCUMENTS

| | | |
|---|---|---|
| JP | 2007-300421 | 11/2007 |
| WO | 03019852 | 3/2003 |
| WO | 2009084609 | 7/2009 |

OTHER PUBLICATIONS 9.19.3 Determination of NDP Source, IEEE P802.11n/D2.00, Feb. 2007.
International Search Report for PCT/JP2008/073666 Mailed Jul. 15, 2009.

* cited by examiner

*Primary Examiner* — Luat Phung
(74) *Attorney, Agent, or Firm* — Turocy & Watson, LLP

(57) ABSTRACT

A wireless communication system includes a first wireless communication apparatus and a second wireless communication apparatus which communicate with each other. The first wireless communication apparatus simultaneously transmitting frames to the second wireless communication apparatus through first to nth (n is an integer of 2 or greater) frequency channels, the second wireless communication apparatus receives the frames from the first wireless communication apparatus through the first to nth frequency channels, judges success or failure of reception of each of the frames by performing error detection, creates delivery confirmation frame including information indicating success or failure of reception of each of the frames, and transmits the delivery confirmation frame through x specific channel (x is an integer in a range from 1 or more to n−1 or fewer) of the first to nth frequency channels to the first wireless communication apparatus a predetermined time after reception of the frames.

10 Claims, 5 Drawing Sheets

WIRELESS COMMUNICATION APPARATUS FOR DATA COMMUNICATION THROUGH TWO OR MORE CHANNELS

TECHNICAL FIELD

The present invention relates to a wireless communication system, wireless communication apparatus, wireless communication method and a program storage medium storing a communication program for carrying out data communication among a plurality of wireless communication apparatuses, and more particularly, to a wireless communication system or the like that carries out data communication simultaneously through two or more channels.

BACKGROUND ART

IEEE802.11 which is a representative standard for wireless LAN (Local Area Network) systems adopts a CSMA/CA (Carrier Sense Multiple Access with Collision Avoidance) scheme as a media access control method. According to the CSMA/CA scheme, transmission is performed after confirming through carrier sensing that a medium is continuously idle for a predetermined time or more to avoid data collision. The continuous wait time in that case is the sum of a minimum time and a wait time of a random length and prevents a plurality of communication apparatuses from simultaneously carrying out transmission a certain time after an immediately preceding communication.

Furthermore, to meet a demand for further enhancement of a transmission rate in a wireless LAN, various proposals of speed enhancement are presented in various techniques of the IEEE802.11n standard. As one such approach, a method of expanding a frequency band, which is a medium, is proposed. While existing IEEE802.11 wireless LAN systems (IEEE802.11a/b/g) carry out communication in a frequency band of 20 MHz per channel, IEEE802.11n extends a channel to a neighboring channel to make it possible to realize communication in a frequency band of 40 MHz corresponding to two channels including the neighboring channel (e.g., see IEEEP802.11n™/D2.00, February 2007).

The IEEE802.11n standard is said to aim at a throughput of over 100 Mbps, there may be demands for further speed enhancement in the future and the IEEE802.11 Study Group has actually started investigations into further speed enhancement. In this regard, one approach for further speed enhancement can be a method of further increasing the number of frequency channels used. As a transmission method in a case where the number of frequency channels used is increased, there can also be a method of realizing carrier sensing on a plurality of channels and carrying out transmission using an idle frequency channel as in the case of a method under study, for example, in a cognitive wireless system (e.g., see JP-A 2007-300421 (Kokai)).

Upon receiving a frame directed to the own terminal, an IEEE802.11 wireless LAN system needs to make a CRC confirmation on the frame and then send a return as to whether the frame has been successfully received after 16 µs, which is called "SIFS (Short Inter Frame Space)" using a response frame (e.g., ACK frame or CTS frame). Therefore, when frame transmission is carried out by applying such an idea like the one described in JP-A 2007-300421 (Kokai) to the IEEE802.11 wireless LAN system, the transmission terminal may simultaneously carry out frame transmission to the same terminal through a plurality of frequency channels, and furthermore the receiving terminal that has received the frame needs to carry out reception processing on the data of the plurality of frequency channels and then simultaneously return a response frame through all the channels of the successfully received frame after a lapse of SIFS. In this way, when such an idea like the one described in JP-A 2007-300421 (Kokai) is applied to the IEEE802.11 wireless LAN system, not only a transmission frame itself but also a response frame returned after SIFS is simultaneously transmitted through a plurality of frequency channels.

As described above, when frame transmission is carried out simultaneously using a plurality of frequency channels, there can be a problem that the reception characteristic at the receiving side terminal deteriorates as transmission power decreases at each channel. This will be explained below.

First, in the currently common mounting of an IEEE802.11-compliant terminal, the sum total of all transmission power is assumed to be constant, as the number of frequency channels used increases, the transmission power per channel generally becomes 1/(number of frequency channels) of that when transmission is carried out using only one channel. In this case, since the transmission power per channel decreases, a signal to noise ratio (SNR) deteriorates at a wireless communication terminal that has received each frame transmitted from each frequency channel with such transmission power compared to the case where transmission is carried out using one channel and a reception error rate increases. As also described above, a response frame after SIFS may also be transmitted using a plurality of frequency channels in an IEEE802.11 wireless LAN, but if a response frame containing reception success/failure information results in an error, more than necessary frame retransmissions may take place or the like and influences of deterioration of the error rate due to the deterioration of frame reception performance are considerable. According to the IEEE802.11n standard, the same frame is also transmitted by "Duplicate" using two channels (40 MHz), but in this case, the above described problem due to the deterioration of transmission power at each channel does not occur because of a combined gain obtained by combining the respective frames. This problem becomes more pronounced when frames are transmitted simultaneously through a plurality of frequency channels and the frames need to be individually handled without being combined on the respective frequency channels.

Furthermore, even when there are no restrictions on the above described mounting of the IEEE802.11-compliant terminal, since it is generally important to suppress power consumption of the wireless LAN terminal to a low level, even if the number of channels used is increased, it is hardly conceivable to multiply transmission power by the number of channels used and transmission power at each channel is considered to tend to be suppressed as the number of channels used increases. Should the number of channels used be increased, if transmission power per channel is not decreased, the reception performance does not deteriorate, but the transmission power at the entire wireless LAN terminal is multiplied by the number of channels used and power consumption thereby becomes a serious problem.

Furthermore, from the standpoint of power consumption, the terminal side which performs carrier sensing on a plurality of channels and carries out frame transmission through idle frequency channels may return a response frame indicating a reception success after SIFS through all frequency channels through which transmission has been carried out, and therefore the terminal side needs to wait for reception so as to be able to receive the response frame through all frequency channels, and power consumption through a reception filter or the like increases compared to the case where the terminal side needs to wait for only one channel. Furthermore, the processing accompanying transmission/reception through a plurality of channels is also a factor for an increase of power consumption compared to the case where transmission/reception is carried out through only one channel.

DISCLOSURE OF THE INVENTION

According to an aspect of the present invention, there is provided with a wireless communication system comprising a first wireless communication apparatus and a second wireless communication apparatus which communicate with each other, wherein the first wireless communication apparatus transmits frames simultaneously to the second wireless communication apparatus through first to nth (n is an integer of 2 or greater) frequency channels, the second wireless communication apparatus receives the frames from the first wireless communication apparatus through the first to nth frequency channels, judges success or failure of reception of each of the frames by performing error detection, creates a delivery confirmation frame including information indicating success or failure of reception of each of the frames, and transmits the delivery confirmation frame through x specific channel (x is an integer in a range from 1 or more to n−1 or fewer) of the first to nth frequency channels to the first wireless communication apparatus a predetermined time after reception of the frames.

According to an aspect of the present invention, there is provided with a wireless communication method, comprising:

transmitting frames simultaneously through first to nth (n is an integer of 2 or greater) frequency channels, receiving the frames through the first to nth frequency channels, judges success or failure of reception of each of the frames by performing error detection, creates a delivery confirmation frame including information indicating success or failure of reception of each of the frames, and transmits the delivery confirmation frame through x specific channel (x is an integer in a range from 1 or more to n−1 or fewer) of the first to nth frequency channels to a transmission source of the frames a predetermined time after reception of the frames.

According to an aspect of the present invention, there is provided with a wireless communication apparatus, comprising:

a transmission unit configured to simultaneously transmitting frames to an other communication apparatus through first to nth (n is an integer of 2 or greater) frequency channels;

a reception unit configured to receive a delivery confirmation frame including information indicating success or failure of reception of each of the frames through x specific channel (x is an integer in a range from 1 or more to n−1 or fewer) of the first to nth frequency channels from the other communication apparatus a predetermined time after transmission of the frames;

an analyzer configured to analyze the delivery confirmation frame to detect success or failure of reception of each of the frames; and a determining unit configured to determine at least one of a frame to be transmitted subsequently to the other communication apparatus according to the success or failure of reception of each of the frames; wherein the transmission unit transmits the determined frame through at least one of a frequency channel from among the first to nth frequency channels.

According to an aspect of the present invention, there is provided with a program storage medium storing a program for inducing a computer to execute instructions to perform the steps of comprising:

transmitting frames simultaneously to an other communication apparatus through first to nth (n is an integer of 2 or greater) frequency channels;

receiving delivery confirmation frame including information indicating success or failure of reception of each of the frames through x specific channel (x is an integer in a range from 1 or more to n−1 or fewer) of the first to nth frequency channels from the other communication apparatus a predetermined time after transmission of the frames;

analyzing the delivery confirmation frame to detect success or failure of reception of each of the frames;

determining at least one of a frame to be transmitted subsequently to the other communication apparatus according to the success or failure of reception of each of the frames; and transmitting the second frame through at least one of a frequency channel from among the first to nth frequency channels.

BEST MODE FOR CARRYING OUT THE INVENTION

With reference now to the attached drawings, embodiments of the present invention will be explained in detail below.

First Embodiment

Figure 1:
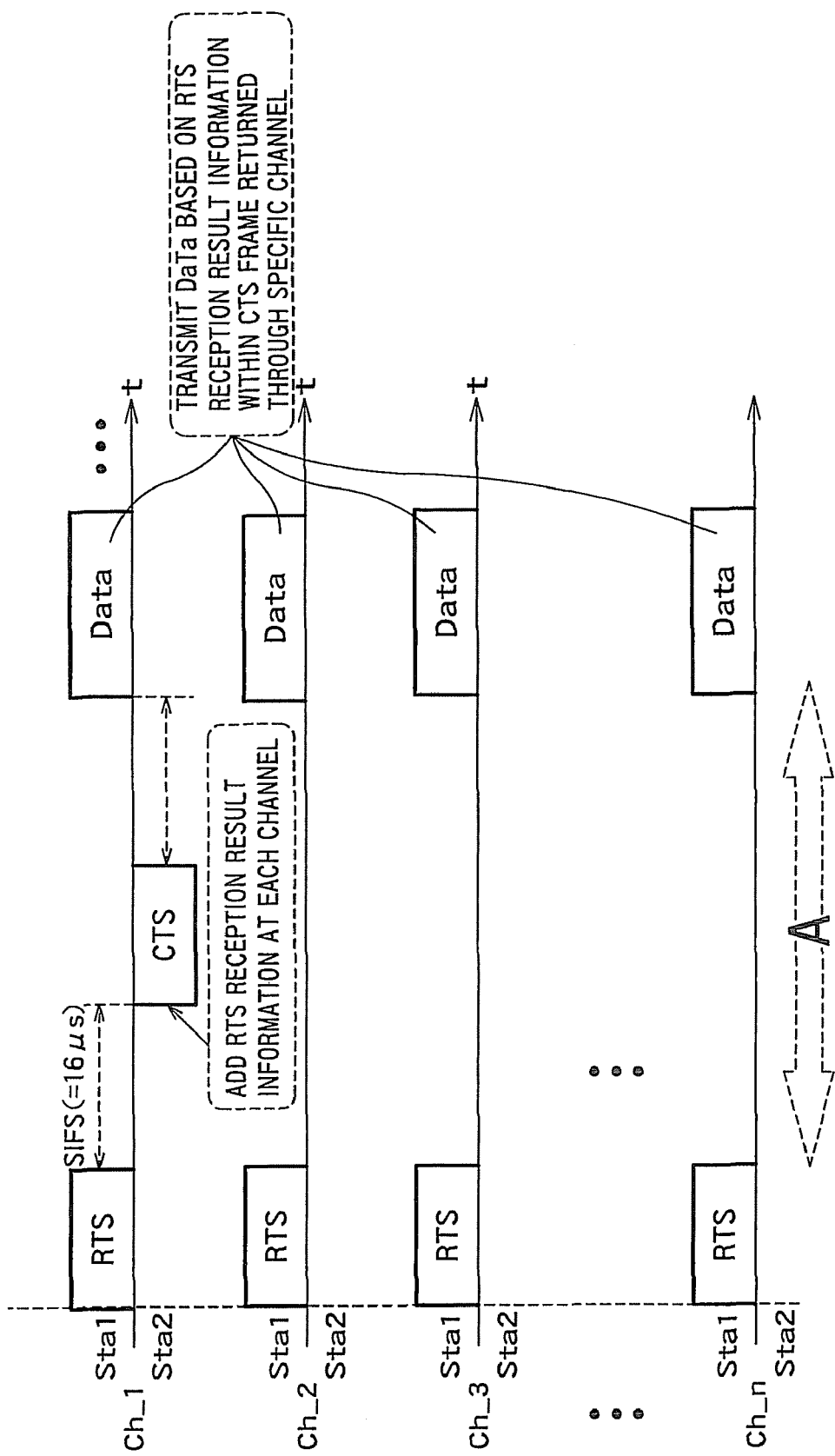
FIG. 1 illustrates transmission/reception of a frame through a plurality of frequency channels in a wireless communication system according to a first embodiment.

FIG. 1 shows an example where frame transmission/reception is carried out between first and second wireless terminals in a wireless communication system according to a first embodiment of the present invention through a plurality of frequency channels. The two wireless terminals communicate with each other through a network such as a wireless LAN (Local Area Network).

The first wireless terminal transmits frames to the second wireless terminal through the plurality of frequency channels (number of channels is "n" in FIG. 1) after carrying out carrier sensing. FIG. 1 shows an example of RTS (Request To Send) frame as the frame to be transmitted, but instead of the RTS frame, any frame may be used as long as the frame requires a delivery confirmation frame (response frame) after SIFS (Short Inter Frame Space) such as normal Data frame, A-MPDU frame which is a plurality of Data frames linked together. Furthermore, in the case of a Data frame, Payloads of the Data frames transmitted through a plurality of channels respectively may be different from each other or may be identical Payloads transmitted through Duplicate transmission. Furthermore, the Data frames may also be Null Data frames including no Payload.

On the other hand, the second wireless terminal waits so as to be able to receive frames through a plurality of frequency channels that may be transmitted from the first wireless terminal and can receive the respective frames simultaneously transmitted by the first wireless terminal through the plurality of channels. After receiving the frames transmitted by the first wireless terminal through the respective frequency channels, the second wireless terminal carries out reception processing such as demodulation on the frames received through the respective channels independently and further checks whether or not any errors are included in the frames received through the respective channels using error detection (here, CRC check) (decides whether reception has succeeded or failed). Here, a delivery confirmation frame including reception success/failure information is created as frames that have been correctly received for frames resulting in CRC=OK and as frames that have not been correctly received for frames resulting in CRC=NG.

Here, the "delivery confirmation frame" refers to a CTS (Clear To Send) frame for an RTS frame, ACK frame for a Data frame and Block ACK frame for an A-MPDU frame. Here, in the delivery confirmation frame of the present embodiment, a subfield for storing reception success/failure information at each of the above described channels is newly added to this delivery confirmation frame (CTS/ACK, Block ACK) specified by the IEEE802.11 wireless LAN.

Figure 2:
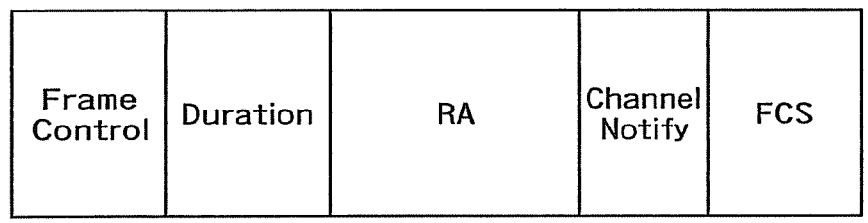
FIG. 2 shows an example of delivery confirmation frame (CTS/ACK) format according to the first embodiment.

FIG. 2 shows an example of delivery confirmation frame format (CTS/ACK) according to the present embodiment. A Channel Notify field is newly added to the CTS/ACK frame format on the IEEE802.11 wireless LAN and the Channel Notify field is the subfield for storing the reception success/failure information at each of the above described channels. When Block ACK is returned as the delivery confirmation frame, the format in which a Channel Notify field is added may be used likewise. In the above described Channel Notify subfield, the result of reception success/failure of frames transmitted through a plurality of channels may be stored like a bitmap or only the frequency channel through which frames have been correctly received may be stored.

After that, the second wireless terminal returns a delivery confirmation frame including reception success/failure information on the frames received through the respective frequency channels using certain specific frequency channel (at least one, and not exceeding n−1 frequency channels) of the above described plurality of frequency channels. The return is performed at timing after a lapse of SIFS (=16 µs) after completion of frame receptions through the plurality of channels. FIG. 1 shows a case where the specific channel for returning a delivery confirmation frame is Ch_1. Details of the specific channel for returning a delivery confirmation frame will be described later.

The first wireless terminal receives a delivery confirmation frame returned through a specific channel, analyzes the frames, and can thereby keep track of, out of frames transmitted through the plurality of channels, which channels have successfully transmitted frames and which channels have failed to transmit frames. After that, the first wireless terminal can retransmit frames or the like based on the transmission success/failure results of the respective frames.

When, for example, frames transmitted through the plurality of channels are RTS frames, it may be possible to check which channels have succeeded in RTS frame transmissions by analyzing CTS frames which are the received delivery confirmation frame and then transmit Data frames using only channels which have succeeded in RTS frame transmissions or the like.

Furthermore, when frames transmitted through the plurality of channels are Data frames, it may be possible to check which channels have succeeded in Data frame transmissions by analyzing ACK frames which are the received delivery confirmation frame and then retransmit Data frames transmitted through channels which have failed in transmissions.

Furthermore, in that case, the Data frames may be retransmitted using various methods including a method using the same channel again, a method using only channels that have succeeded in transmissions and a method selecting channels again by carrying out carrier sensing again. The case where the frames transmitted through a plurality of channels are A-MPDU frames resulting from linking together a plurality of Data frames is also basically the same as the case where the frames transmitted through a plurality of channels are Data frames except in that the delivery confirmation frame is replaced by a Block ACK frame.

In the case where the first wireless terminal cannot confirm the reception of a delivery confirmation frame through the above described certain specific channel after a lapse of SIFS after transmitting frames through a plurality of channels, the first wireless terminal cannot confirm the delivery for all the plurality of channels which have carried out transmissions, and thereby assumes that the transmission frames have resulted in errors on all channels and carries out subsequent transmission processing.

Next, the transmission power when the first wireless terminal and second wireless terminal transmit frames will be explained. The present proposed system is any one of a system carrying out transmission assuming that the sum total of all transmission power is constant (=P) as the wireless terminal and a system carrying out transmission assuming that transmission power at one channel is always constant (=P).

In the case of the system carrying out transmission assuming that the sum total of all transmission power is constant, transmission power at each channel decreases as the number of channels carrying out transmissions simultaneously increases. When, for example, transmission power is uniformly distributed among the respective channels, if the number of channels carrying out transmissions simultaneously is assumed to be n, the transmission power at each channel is P/n. The transmission power at each channel need not always be distributed uniformly. In this way, even when the number of channels carrying out transmissions simultaneously increases, it is possible to prevent the sum total of transmission power from increasing.

Furthermore, in the case of the system carrying out transmission assuming that transmission power at one channel is always constant, the sum total of transmission power increases as the number of channels carrying out transmissions simultaneously increases. On the other hand, since transmission power at each channel need not be reduced, it is possible to prevent deterioration or the like of the SN ratio of frames transmitted through each channel.

Figure 8:
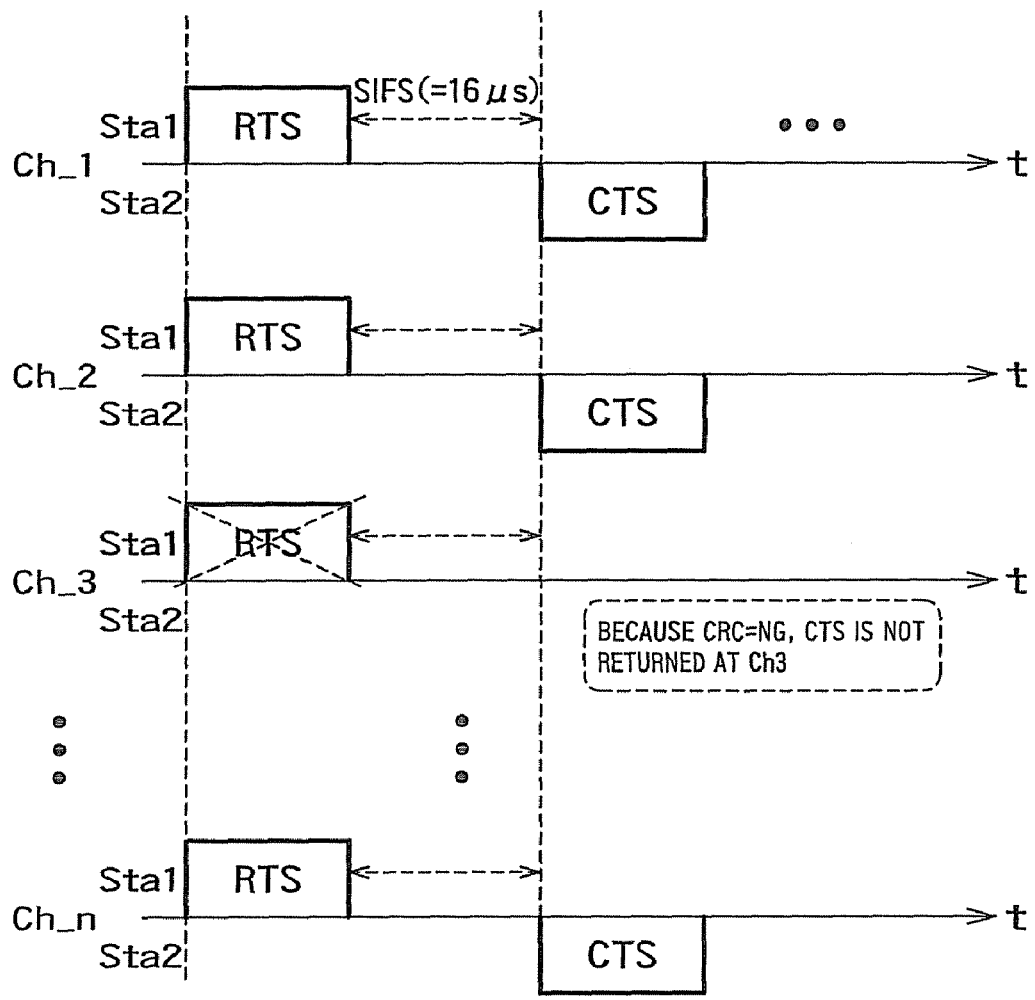
FIG. 8 illustrates a conventional delivery confirmation frame returning method when frame transmission is carried out using a plurality of channels.

As described above, the present proposed system returns a delivery confirmation frame including reception result information of the respective frames received through the plurality of channels through only certain specific channel and thereby reports reception success/failure at each channel. In a conventional example shown in FIG. 8, delivery confirmation frames are simultaneously returned through all channels which have succeeded in receptions, whereas the present embodiment reports reception success/failure of all frames through only certain specific channel, and can thereby reduce the number of delivery confirmation frames to be returned. Therefore, when the sum total of transmission power as the wireless communication apparatus is defined, it is possible to increase transmission power at the time of transmission of a delivery confirmation frame and improve the reception performance of the a delivery confirmation frame. Furthermore, when the sum total of transmission power as the wireless communication apparatus is not defined, it is possible to reduce transmission power in delivery confirmation frame transmission and thereby realize low power consumption. Furthermore, since it is only necessary to carry out transmission processing and reception processing on a delivery confirmation frame through only specific channel, the processing itself leads to low power consumption compared to the case where transmission processing and reception processing are carried out through all channels.

On the other hand, the IEEE802.11 wireless LAN provides, together with packet collision avoidance through physical carrier sensing, a packet collision avoidance function through virtual carrier sensing by NAV (Network Allocation Vector). The virtual carrier sensing function by NAV controls transmission on terminals other than the frame transmission destinations using the time set in the Duration field in the MAC header of the frame as NAV. The IEEE802.11 wireless LAN sets a time required to complete reception of at least a delivery confirmation frame with respect to a transmission frame (when the transmission frame is an RTS frame, time until at least the delivery confirmation frame of the next data frame) as the NAV value to be set in the Duration field and basically sets 0 when the transmission frame is a frame not requiring a delivery confirmation frame.

Inheriting the policy of the IEEE802.11 wireless LAN, when the first wireless terminal transmits frames simultaneously through a plurality of channels, no delivery confirmation frame is returned after SIFS through channels other than the specific channel through which a delivery confirmation frame is returned, and therefore 0 is normally set in the Duration field in the transmission frame. However, suppose the present proposed system sets the time until at least a delivery confirmation frame is returned also in the transmission frames on the channels other than the specific channel as in the case of the Duration field in the transmission frames in the above described specific channel. That is, irrespective of whether or not a channel is a specific channel through which a delivery confirmation frame is returned, suppose the time until at least a delivery confirmation frame is returned is set in all the Duration fields in the respective frames of the plurality of channels through which simultaneous transmissions are carried out. This prevents other terminals from acquiring the right to transmit the channels until transmissions of subsequent Data frames. That is, transmission is not carried out through channels other than the specific channel through which a delivery confirmation frame is returned for a period indicated by "A" in FIG. 1, and therefore though the carrier remains IDLE for SIFS or more, setting the time in the Duration field as described above (using the virtual carrier sensing function) can prevent other terminals from acquiring the transmission right through carrier sensing and transmitting the frames in the meantime.

Next, the specific channel through which a delivery confirmation frame including reception success/failure information of frames at the respective frequency channels are returned will be explained. In the present embodiment, suppose when the wireless terminal which is an access point in the network starts a network or when the wireless terminal is opening a network, the wireless terminal determines specific channel through which a delivery confirmation frame are returned. The wireless terminal which is the access point reports a channel determined at the start of a network or during opening of a network to all terminals in the network using broadcast frames such as a Beacon frame which is a Broadcast frame or Probe Response frame. This allows all the terminals in the network including the first wireless terminal and second wireless terminal to recognize the specific channel through which a delivery confirmation frame including reception success/failure information of the frames in the respective frequency channels are returned. Furthermore, it is also possible to change the specific channel to an other frequency channel while opening the network. Moreover, there is basically no difference whether the first wireless terminal or the second wireless terminal itself is a terminal operating as the access point.

This allows the second wireless terminal to recognize the specific channel through which a delivery confirmation frame are returned, and can thereby return the delivery confirmation frame through the specific channel after SIFS after simultaneously receiving the frames through the plurality of channels. Furthermore, the first wireless terminal can also keep track of the specific channel through which frames are returned beforehand through broadcasting from the access point. Therefore, after simultaneously transmitting frames through a plurality of channels, the first wireless terminal waits for a return of a delivery confirmation frame after at least SIFS through only the specific channel which have been successfully kept track of, and can thereby confirmation delivery at all channels through which transmissions have been carried out. Therefore, in the related arts, the first wireless terminal needs to wait for reception of a delivery confirmation frame through all the channels (see FIG. 8), whereas in the present embodiment, the first wireless terminal needs only to wait for reception of a delivery confirmation frame through only the certain specific channel, and it is thereby possible to reduce power consumption through a reception filter or the like of the first wireless terminal. Here, the first wireless terminal preferably performs control so as to wait for the delivery confirmation frame through only the specific channel for a reduction of power consumption, but the first wireless terminal need not always wait for the delivery confirmation frame through only the specific channel and may be adapted so as to wait for the delivery confirmation frames through all channels without performing any particular control.

Furthermore, when selecting specific channel to return a delivery confirmation frame including reception success/failure information of frames through the respective frequency channels, the wireless terminal operating as the access point uses any one of the following policies.

First, a method of always specifying a fixed frequency channel as a specific channel.

Second, a method of specifying a frequency channel randomly selected from among a plurality of channels through which transmissions are carried out as specific channel.

Third, a method of estimating a channel utilization rate at each channel of the plurality of channels through which transmissions are carried out and specifying a channel having a low channel utilization rate as specific channel.

Fourth, a method of specifying, when it is possible to estimate a frequency channel having a high probability of occurrence of a problem of hidden terminals using some method, a frequency channel having a high probability of occurrence of a problem of hidden terminals as specific channel.

When a channel is selected using the third method, a delivery confirmation frame can be returned using a channel having a low probability of collision or interference during frame transmission, and it is thereby possible to increase the robustness of the delivery confirmation frame against errors. Furthermore, when a channel is selected using the fourth method, a delivery confirmation frame is returned using a channel having a high probability of occurrence of a problem of hidden terminals and it is thereby possible to prevent the problem of hidden terminals from occurring at such a channel.

When a channel utilization rate at each channel is estimated using the third method, suppose the time during which a channel is busy is measured using a carrier sensing result at each channel and the rate (busy rate) for a certain period is calculated and the value is used as a channel utilization rate at each channel. Furthermore, when the utilization rate of the channel is calculated, it is also possible to estimate the extent to which the channel is used for a certain period and thereby estimate the channel utilization rate based on the number of terminals accommodated and Traffic Stream (TS) information set by each terminal instead of the busy rate through carrier sensing. Furthermore, to estimate the channel utilization rate, averaging may be carried out with any frequency or at any interval, for example, averaging may be carried out consecutively from the start of a network, or averaging or updating may be carried out for a certain period (e.g., beacon interval period) or averaging or updating may be carried out at an interval of a certain number of frame transmissions or receptions.

Furthermore, as for the specific channel selected using any one of the above described methods, it is basically possible to select only one channel from the standpoint of the effects of the present proposed system such as improvement of performance of receiving a delivery confirmation frame, reduction of transmission power in delivery confirmation frame transmission, but the number of channels need not always be one. For example, it may be possible to use two specific channels for returning delivery confirmation frames, Duplicate-transmit delivery confirmation frames including reception success/failure information of frames at each frequency channel using those channels and thereby increase robustness of the delivery confirmation frames against errors or consider the problem with hidden terminals using two channels. When the problem with hidden terminals is considered, the number of channels to be selected may also be two or more.

The present embodiment has explained the case where a wireless terminal operating as an access point selects and reports specific channel through which a delivery confirmation frame is returned, but instead of the wireless terminal operating as an access point making a selection, the system may also be adapted so as to predetermine a specific channel. In this case, since the system predetermines a specific channel, the respective wireless terminals can keep track of a channel for returning a delivery confirmation frame without the wireless terminal operating as an access point reporting to the wireless terminals within the network using a broadcast channel.

Figure 3:
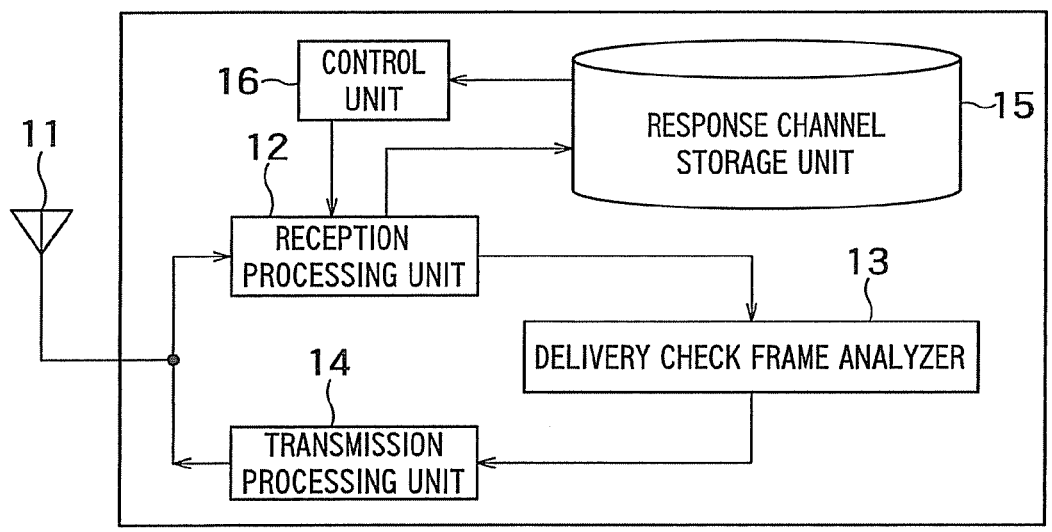
FIG. 3 is a block diagram showing a configuration example of a wireless communication apparatus (delivery confirmation frame receiving side: first wireless terminal) according to the first embodiment.
Figure 4:
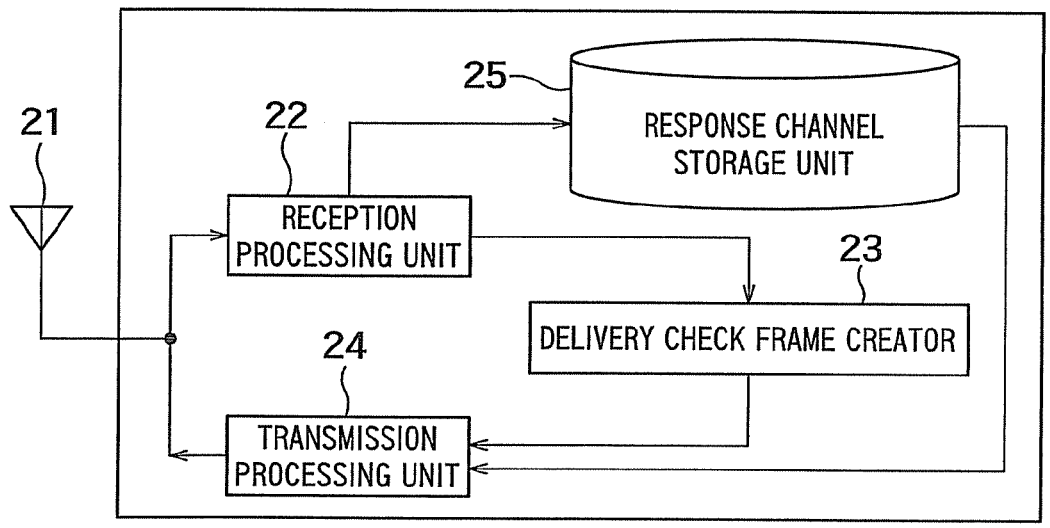
FIG. 4 is a block diagram showing a configuration example of a wireless communication apparatus (delivery confirmation frame transmitting side: second wireless terminal) according to the first embodiment.

Next, the wireless communication apparatuses operating as the first wireless terminal and second wireless terminal will be explained. FIG. 3 is a block diagram showing a configuration example of a wireless communication apparatus (first wireless communication apparatus) operating as a first wireless terminal and FIG. 4 is a block diagram showing a configuration example of a wireless communication apparatus operating as a second wireless terminal (second wireless communication apparatus).

The first wireless communication apparatus in FIG. 3 is constructed of at least an antenna unit 11, a reception processing unit 12, a delivery confirmation frame analyzer 13, a transmission processing unit 14, a response channel storage unit 15 and a control unit 16. The antenna unit 11 and reception processing unit 12 constitute, for example, a reception unit. Furthermore, the antenna unit 11 and transmission processing unit 14 constitute, for example, a transmission unit.

First, the transmission processing unit 14 carries out transmission processing, generates a plurality of frames, carries out carrier sensing and then simultaneously transmits the frames through a plurality of frequency channels through the antenna unit 11. The transmission processing unit 14 may include a period setting unit that sets a period during which a delivery confirmation frame can be returned in the Duration field of each frame. After a lapse of SIFS, the reception processing unit 12 carries out reception processing on the delivery confirmation frame returned through the specific channel through the antenna unit 11. Here, the response channel storage unit 15 stores the frequency channel through which the delivery confirmation frame is returned. Since the information on the specific channel is reported from the wireless terminal which is the access point by means of a Beacon frame or Probe Response frame, when the corresponding frame from the wireless terminal which is the access point is subjected to reception processing by reception processing unit 12, the response channel storage unit 15 stores the reported frequency channel. When the reception processing unit 12 carries out reception processing on the delivery confirmation frame returned through the specific channel after the above described lapse of SIFS, the control unit 16 controls the reception processing unit 12 so as to wait for the delivery confirmation frame only through the frequency channel stored in the response channel storage unit 15.

After the reception processing unit 12 carries out reception processing on the returned delivery confirmation frame, the frame is inputted to the delivery confirmation frame analyzer 13, and the delivery confirmation frame analyzer 13 analyzes reception success/failure information of the frame at each frequency channel included in the delivery confirmation frame. The transmission processing unit 14 determines the next frame to be transmitted (second frame) based on the reception success/failure information of the frame which has been successfully kept track of by the delivery confirmation frame analyzer 13 and transmits the frame. When, for example, transmission of the Data frame fails, this frame is determined as a transmission frame (retransmission frame) and when transmission of the frame succeeds, a new frame is determined as a transmission frame, and when transmission of the RTS frame succeeds, the Data frame is determined as a transmission frame. The transmission processing unit 14 is provided with a determining unit that determines the second frame to be transmitted next according to reception success/failure of each frame.

On the other hand, the second wireless communication apparatus in FIG. 4 is constructed of at least an antenna unit 21, a reception processing unit 22, a delivery confirmation frame creator 23, a transmission processing unit 24 and a response channel storage unit 25. The antenna unit 21 and reception processing unit 22 constitutes, for example, a reception unit. The antenna unit 21 and transmission processing unit 24 constitutes, for example, a transmission unit.

Here, as in the case of the response channel storage unit 15 in FIG. 3, the response channel storage unit 25 stores a frequency channel through which a delivery confirmation frame is returned reported from the wireless terminal which is the access point by means of a Beacon frame or a Probe Response frame.

The second wireless communication apparatus receives frames simultaneously transmitted through a plurality of frequency channels through the antenna unit 21 and the reception processing unit 22 carries out reception processing on the frames independently of each other. In such a case, as one process of reception processing, the reception processing unit 22 also makes a CRC check on the frame received at each frequency channel. The reception processing unit 22 includes an error detection unit that performs error detection on each frame. The CRC result information of the frame at each channel is inputted to delivery confirmation frame creator 23. The delivery confirmation frame creator 23 creates a delivery confirmation frame including the inputted CRC result information of the frame of each channel, that is, the reception success/failure information of the frame of each channel. The delivery confirmation frame created is returned after a lapse of SIFS through the transmission processing unit 24 using a frequency channel stored in the response channel storage unit 25.

Figure 5:
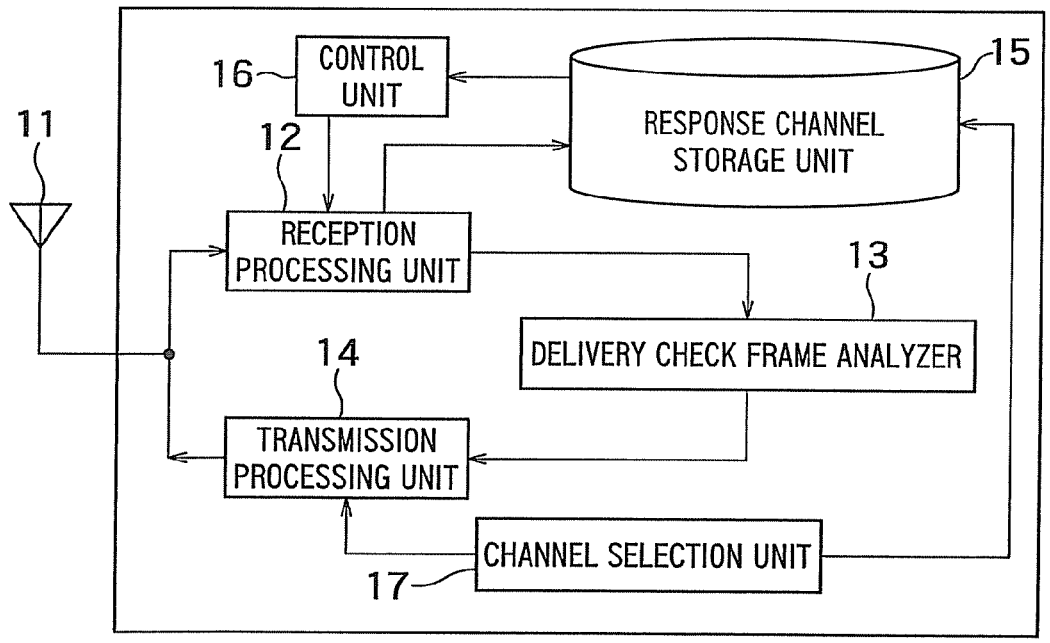
FIG. 5 is a block diagram showing a configuration example when the wireless communication apparatus of the first embodiment (delivery confirmation frame receiving side: first wireless terminal) is a terminal operating as an access point.

Here, when the first wireless communication apparatus in FIG. 3 operates as an access point, the first wireless communication apparatus is further provided with a channel selection unit that selects a specific channel through which the delivery confirmation frame including the reception success/failure information of the frame at each frequency channel is returned. FIG. 5 shows a block diagram when the first wireless communication apparatus operates as an access point. The channel selection unit 17 selects a specific channel through which the delivery confirmation frame including reception success/failure information of the frame at each frequency channel is returned and stores the selected frequency channel in the response channel storage unit 15. As explained above, the channel selection unit 17 selects a frequency channel according to any one of the four policies. Furthermore, the channel selection unit 17 reports the selected frequency channel to other wireless terminals (other communication apparatuses) within the network as the specific channel through which the delivery confirmation frame including the reception success/failure information of the frame at each frequency channel is returned. More specifically, the channel selection unit 17 reports the frequency channel selected through transmission of a broadcast frame such as a Beacon frame and Probe Response frame through the transmission processing unit 14. The channel selection unit 17 includes a channel reporting unit that reports the selected specific channel to other wireless terminals within the network.

Furthermore, when the second wireless communication apparatus in FIG. 4 also operates as an access point, a channel selection unit 17 similar to that in FIG. 5 needs only to be added and a frequency channel is selected and reported in the same way as described above. Since the rest of the processing is the same as that explained in FIG. 4, detailed explanations thereof will be omitted.

Second Embodiment

In the first embodiment, the wireless terminal operating as an access point selects and reports a specific channel through which a delivery confirmation frame is returned or the system predetermines a specific channel. On the contrary, in the second embodiment, the first wireless terminal selects a specific channel and reports the selected specific channel to the second wireless terminal which is the transmission destination through frames simultaneously transmitted through a plurality of frequency channels. Since the first wireless terminal itself can select a specific channel in this way, it is possible to specify the specific channel at the convenience of the first wireless terminal even when the first wireless terminal does not operate as the access point.

Furthermore, the policy when the first wireless terminal makes a channel selection is similar to the policy when the wireless terminal according to the first embodiment that operates as an access point makes a channel selection. However, in the present embodiment, since the first wireless terminal can specify a specific channel every time the first wireless terminal transmits frames simultaneously through a plurality of frequency channels, when, for example, the method described as the third policy (method of estimating a channel utilization rate or busy rate at each channel of the plurality of channels carrying out transmissions and specifying a channel having a low channel utilization rate as a specific channel) is used, a more adaptive selection is possible in correspondence with variations in the channel utilization rate or busy rate at each channel.

The first wireless terminal transmits the respective frames to be transmitted through a plurality of frequency channels with the selected specific channel information added thereto and the second wireless terminal can keep track of the specific channel through which a delivery confirmation frame should be returned after a lapse of SIFS by succeeding in reception of at least one frame out of the frames of the plurality of frequency channels.

Configuration examples of the wireless communication apparatuses that operate as the first wireless terminal and second wireless terminal of the present embodiment are similar to those in FIG. 5 and FIG. 4, but their respective response channel storage units may not be required depending on the mounting.

Furthermore, according to the present embodiment, since the first wireless communication apparatus in FIG. 5 that operates as the first wireless terminal reports the frequency channel selected by the channel selection unit 17 to the second wireless communication apparatus which is the terminal of the other party, a function of adding information of the selected frequency channel to the respective frames transmitted through the plurality of channels is newly added to the transmission processing unit 14. On the other hand, in the second wireless terminal apparatus in FIG. 4 that operates as the second wireless terminal, a function of analyzing specific channel information added to the respective frames is added when frames are simultaneously received through a plurality of frequency channels through the antenna unit 21 and the reception processing unit 22 performs reception processing on those frames independently of each other. The other parts are basically the same as those of the first embodiment.

Third Embodiment

The third embodiment has a feature that a second wireless terminal that returns delivery confirmation frames selects a specific channel through which a delivery confirmation frame including reception success/failure information of frames at respective frequency channels is returned.

The second wireless terminal receives frames transmitted through their respective frequency channels, performs reception processing on the respective frames, then selects a specific channel through which a delivery confirmation frame is returned from among frequency channels which have succeeded reception through a CRC check and returns a delivery confirmation frame through the selected channel. Here, when selecting the specific channel from among the frequency channels which have succeeded reception through the CRC check, if two or more channels have succeeded reception, the second wireless terminal selects a specific channel from among those frequency channels based on any one of the following policies.

First, a method of selecting, when priority is assigned to each frequency channel beforehand, a specific channel from among channels which have succeeded reception according to the priority.

Second, a method of randomly selecting a specific channel from among channels which have succeeded reception.

Third, a method of selecting a channel having a low channel utilization rate as a specific channel from among channels based on the channel utilization rate at each channel which has succeeded reception.

Fourth, a method of selecting, when it is possible to estimate frequency channels having a high probability of the occurrence of a problem with hidden terminals using some method, a frequency channel having a high probability of the occurrence of a problem with hidden terminals as a specific channel from among channels which have succeeded reception.

According to the present embodiment, since the second wireless terminal selects a specific channel through which a delivery confirmation frame is returned based on reception results of frames transmitted through a plurality of channels, the first wireless terminal cannot keep track of a channel through which the delivery confirmation frame is returned. Therefore, it is not possible to wait for a frame only through a specific channel through which the delivery confirmation frame is returned as in the case of the first embodiment and second embodiment and it is necessary to wait so that the delivery confirmation frame can be received through all channels. However, even by doing so, the present embodiment allows the second wireless terminal to determine a channel selected from among channels which have correctly received frames from among simultaneously transmitted frames as a specific channel, that is, select a specific channel based on an immediately preceding reception result, and can thereby transmit a delivery confirmation frame using a highly reliable channel.

Figure 6:
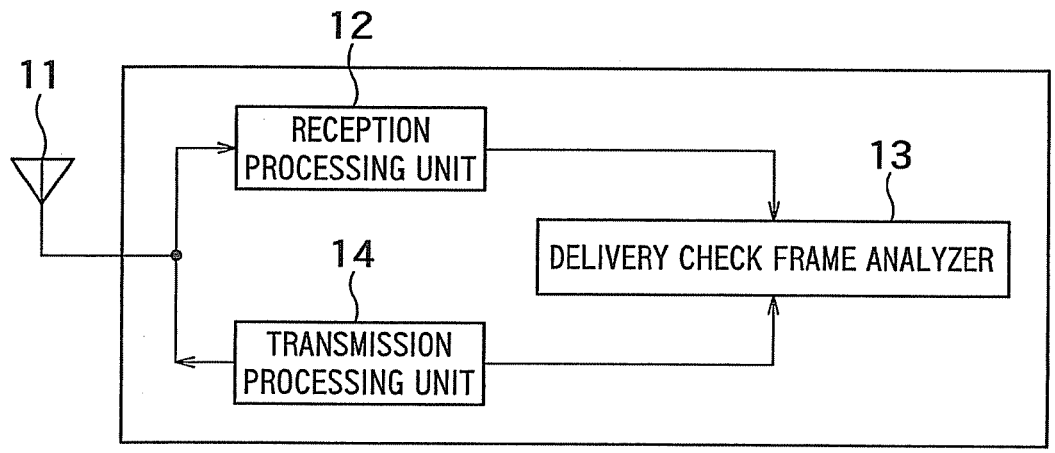
FIG. 6 is a block diagram showing a configuration example of a wireless communication apparatus (delivery confirmation frame receiving side: first wireless terminal) according to a third embodiment.
Figure 7:
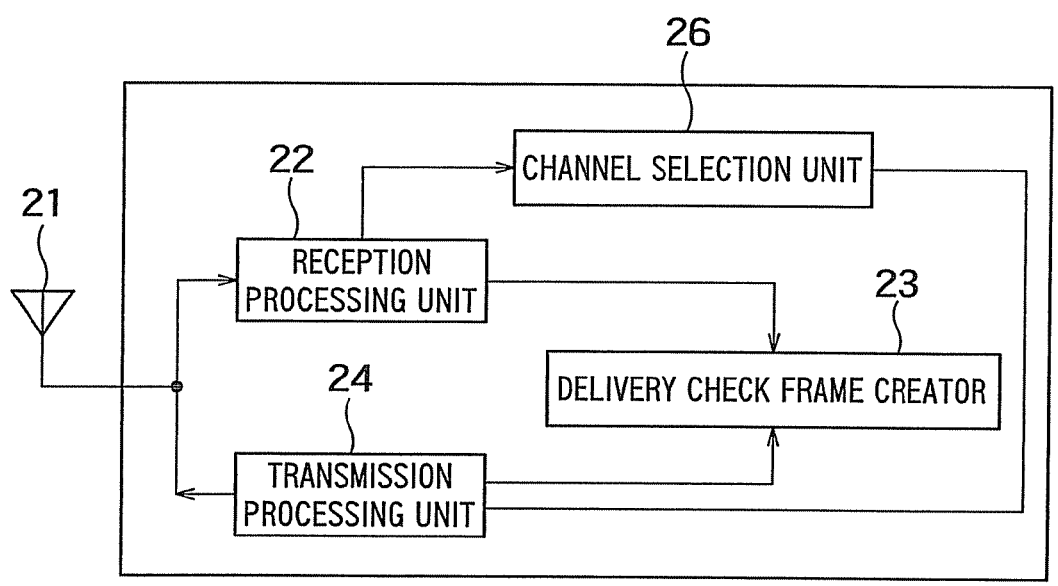
FIG. 7 is a block diagram showing a configuration example of a wireless communication apparatus according to the third embodiment (delivery confirmation frame transmitting side: second wireless terminal)

FIG. 6 shows a configuration example of a wireless communication apparatus (first wireless communication apparatus) that operates as the first wireless terminal according to the present embodiment and FIG. 7 shows a configuration example of a wireless communication apparatus (second wireless communication apparatus) that operates as the second wireless terminal according to the present embodiment. In the first wireless terminal apparatus in FIG. 6, the reception processing unit 12 waits so that a delivery confirmation frame can be received through any frequency channels. The present embodiment does not require the response channel storage unit 15 or control unit 16 or the like shown in FIG. 3 or the like which is the configuration example of the first wireless terminal apparatus of the first embodiment. On the other hand, a channel selection unit 26 is added in the second wireless terminal apparatus in FIG. 7. The channel selection unit 26 selects a specific channel through which a delivery confirmation frame is returned from among frequency channels which at least have succeeded in reception based on a CRC check result of frames transmitted through a plurality of channels by the reception processing unit 22. The channel selection unit 26 hands over information on the specific channel through which the selected a delivery confirmation frame is returned to the transmission processing unit 24 and the transmission processing unit 24 returns the delivery confirmation frame including reception success/failure information of the frames at the respective frequency channels created by the delivery confirmation frame creator 23 after a lapse of SIFS through the specific channel handed over from the channel selection unit 26. Other parts are basically the same as those of the first embodiment.

The wireless communication apparatus of this embodiment may also be realized using a general-purpose computer device as basic hardware. That is, the transmission processing unit, reception processing unit, delivery confirmation frame analyzer, delivery confirmation frame creator, control unit and channel selection unit can be realized by causing a processor mounted in the above described computer device to execute a program. In this case, the wireless communication apparatus may be realized by installing the above described program in the computer device beforehand or may be realized by storing the program in a storage medium such as a CD-ROM or distributing the above described program over a network and installing this program in the computer device as appropriate. Furthermore, the response channel storage may also be realized using a memory device or hard disk incorporated in or externally added to the above described computer device or a storage medium such as CD-R, CD-RW, DVD-RAM, DVD-R as appropriate.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:
1. A wireless communication apparatus, comprising:
a reception unit configured to simultaneously receive frames through first to nth frequency channels from an other communication apparatus, where n is an integer of 2 or greater;
an error detection unit configured to perform error detection on the frames to judge success or failure of reception of each of the frames;
a delivery confirmation frame creator configured to create a delivery confirmation frame including information indicating success or failure of reception of each of the frames; and
a transmission unit configured to transmit the delivery confirmation frame through x specific channel of the first to nth frequency channels to the other communication apparatus after a predetermined time from reception of the frames, where x is an integer in a range from 1 or more to n−1 or fewer, and wherein transmission on each of the frequency channels from the other communication apparatus is performed with first transmission power, respectively, and the transmission unit performs transmission on each of the x specific channel with the first transmission power, respectively.

2. The apparatus according to claim 1, wherein the specific channel for transmitting the delivery confirmation frame is determined in advance.

3. The apparatus according to claim 1, wherein the reception unit communicates with an access point configured to select the specific channel from among the first to nth frequency channels and broadcast the selected specific channel by using broadcast frames, and obtains information of the specific channel by receiving the broadcast frames.

4. The apparatus according to claim 1, wherein the reception unit receives information of the specific channel from the other communication apparatus through at least one of the frames to be transmitted through the first to nth frequency channels.

5. The apparatus according to claim 1, further comprising:

a channel selection unit configured to select the specific channel from among frequency channels which have succeeded in reception of the frames.

6. A wireless communication apparatus, comprising:

a transmission unit configured to simultaneously transmit frames to an other communication apparatus through first to nth frequency channels, where n is an integer of 2 or greater;

a channel selection unit configured to select x specific channel from among the first to nth frequency channels, where x is an integer in a range from 1 or more to n−1 or fewer;

a channel reporting unit configured to report the specific channel to the other communication apparatus;

a control unit configured to control to wait for reception of a delivery confirmation frame including information indicating success or failure of reception of each of the frames at the specific channel;

a reception unit configured to receive the delivery confirmation frame through the specific channel from the other communication apparatus after a predetermined time from transmission of the frames;

an analyzer configured to analyze the delivery confirmation frame to detect success or failure of reception of each of the frames; and a determining unit configured to determine at least one of a frame to be transmitted subsequently to the other communication apparatus according to the success or failure of reception of each of the frames; wherein the transmission unit transmits the determined frame through at least one of a frequency channel from among the first to nth frequency channels.

7. The apparatus according to claim 6, wherein the channel reporting unit reports the specific channel by including information of the specific channel in at least one of the frames to be transmitted through the first to nth frequency channels.

8. The apparatus according to claim 6, wherein the channel selection unit selects n−1 or fewer frequency channels from among the first to nth frequency channels in ascending order of channel utilization rates, as the specific channel.

9. The apparatus according to claim 8, wherein the channel selection unit calculates the channel utilization rates according to rates at which the frequency channels are busy for a constant period based on a carrier sensing.

10. The apparatus according to claim 6, further comprising:

a period setting unit which sets a period during which a delivery confirmation frame can be returned, to a predetermined field of each frame to be transmitted through the first to nth frequency channels, wherein the transmission unit transmits the frames to which the period is set so that during the period, another communication apparatuses are inhibited to transmit a frame on the first to nth frequency channels.

* * * * *